(12) United States Patent
Plecko (10) Patent No.: US 11,155,248 B2
(45) Date of Patent: Oct. 26, 2021

(54) METHOD FOR ASCERTAINING THE SLOPE OF A ROADWAY

(71) Applicant: Robert Bosch GmbH, Stuttgart (DE)

(72) Inventor: Sven Plecko, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 16/142,400

(22) Filed: Sep. 26, 2018

(65) Prior Publication Data

US 2019/0092290 A1 Mar. 28, 2019

(30) Foreign Application Priority Data

Sep. 26, 2017 (DE) .................. 10 2017 217 008

(51) Int. Cl.
| | |
|---|---|
| *B60T 7/12* | (2006.01) |
| *B60T 8/17* | (2006.01) |
| *B60T 7/22* | (2006.01) |
| *G06T 7/60* | (2017.01) |
| *G06T 7/73* | (2017.01) |

(52) U.S. Cl.
CPC .................... *B60T 7/12* (2013.01); *B60T 7/22* (2013.01); *B60T 8/17* (2013.01); *G06T 7/60* (2013.01); *G06T 7/73* (2017.01); *B60T 2201/04* (2013.01); *B60T 2201/10* (2013.01); *B60T 2210/10* (2013.01); *B60T 2210/20* (2013.01); *B60T 2210/32* (2013.01); *G06T 2207/30252* (2013.01)

(58) Field of Classification Search
CPC ..... B60T 7/12; B60T 7/22; B60T 8/17; B60T 2201/04; B60T 2201/10; B60T 2210/10; B60T 2210/20; B60T 2210/32; G06T 7/73; G06T 7/60; G06T 2207/30252
See application file for complete search history.

(56) References Cited

U.S. PATENT DOCUMENTS

| | | | | |
|---|---|---|---|---|
| 10,589,747 | B2 * | 3/2020 | Plecko ................ | B60W 40/076 |
| 2004/0080450 | A1 * | 4/2004 | Cheong ................ | G01S 7/4026 |
| | | | | 342/118 |
| 2005/0168575 | A1 * | 8/2005 | Mattes ................ | B60R 21/013 |
| | | | | 348/148 |
| 2007/0173984 | A1 * | 7/2007 | Nakayama ............... | B60T 7/12 |
| | | | | 701/1 |
| 2009/0103781 | A1 * | 4/2009 | Fleury ................ | B60W 40/076 |
| | | | | 382/104 |

(Continued)

FOREIGN PATENT DOCUMENTS

DE    10 2013 221 696 A1    4/2015

*Primary Examiner* — Thomas E Worden
(74) *Attorney, Agent, or Firm* — Maginot, Moore & Beck LLP (57) ABSTRACT

A method for determining a slope of a roadway on which a vehicle is located includes imputing image data, supplied by an image sensor, pertaining to surroundings of the vehicle, identifying a defined reference object in the surroundings of the vehicle using the image data, determining an angle relationship between the reference object and the surroundings, estimating a slope of the roadway with reference to the determined angle relationship, and generating a signal indicative of the slope of the roadway. A device for determining a slope of a roadway on which a vehicle is located is configured to execute such a method.

14 Claims, 4 Drawing Sheets

(56) References Cited

U.S. PATENT DOCUMENTS

| | | | | |
|---|---|---|---|---|
| 2011/0032374 A1* | 2/2011 | Imanishi | ............ | B60R 1/00 |
| | | | | 348/222.1 |
| 2012/0294481 A1* | 11/2012 | Kasaoki | ............ | G06K 9/4638 |
| | | | | 382/103 |
| 2014/0278065 A1* | 9/2014 | Ren | ............ | G06T 17/00 |
| | | | | 701/454 |
| 2015/0049913 A1* | 2/2015 | Zhong | ............ | G06K 9/00798 |
| | | | | 382/104 |
| 2015/0175055 A1* | 6/2015 | Falb | ............ | B60Q 1/115 |
| | | | | 701/49 |
| 2015/0245020 A1* | 8/2015 | Meier | ............ | G06T 7/75 |
| | | | | 348/135 |
| 2015/0269732 A1* | 9/2015 | Liaw | ............ | B60Q 9/008 |
| | | | | 382/103 |
| 2015/0301159 A1* | 10/2015 | Scheschko | ............ | G01S 7/4026 |
| | | | | 342/174 |
| 2016/0332568 A1* | 11/2016 | Kim | ............ | B60Q 1/50 |
| 2017/0039718 A1* | 2/2017 | Kotake | ............ | G06T 17/00 |
| 2017/0357861 A1* | 12/2017 | Okuda | ............ | G06K 9/00805 |
| 2018/0057003 A1* | 3/2018 | Hyun | ............ | B60W 40/06 |
| 2018/0165822 A1* | 6/2018 | Uliyar | ............ | G06K 9/00798 |
| 2018/0211394 A1* | 7/2018 | Sergeev | ............ | G06T 7/97 |
| 2019/0337515 A1* | 11/2019 | Hyun | ............ | B60W 50/0097 |
| 2020/0108836 A1* | 4/2020 | Tanaka | ............ | B60W 40/072 |

* cited by examiner

Fig. 4

METHOD FOR ASCERTAINING THE SLOPE OF A ROADWAY

This application claims priority under 35 U.S.C. § 119 to patent application no. DE 10 2017 217 008.5, filed on Sep. 26, 2017 in Germany, the disclosure of which is incorporated herein by reference in its entirety.

This disclosure relates to a method for ascertaining a slope of a roadway on which a vehicle is located, wherein the method comprises the following steps: inputting image data of surroundings of the vehicle supplied by an image sensor, ascertaining a defined reference object in the surroundings of the vehicle from the image data, ascertaining an angle relationship between the reference object and the surroundings, estimating the slope of the roadway based on the ascertained angle relationship, and providing a signal representing the slope of the roadway. The disclosure furthermore relates to a correspondingly configured device to execute the method.

BACKGROUND

The patent application DE 10 2013 221 696 A1 is known from the prior art, for example. This document relates to a method for ascertaining a height profile of a road located in front of a vehicle. In this case, the method comprises a step of inputting a movement profile of an object supplied by an image sensor, wherein the movement profile is input as a plurality of images, and of inputting at least one parameter with respect to the object by a parameter sensor independent of the image sensor. Furthermore, the method comprises a step of determining the height profile of the road located in front of the vehicle using at least one vertical position of the object in the image and the parameter, in order to ascertain the height profile of the road located in front of the vehicle.

For various driving maneuvers, for example, for autonomous parking (HAP—highly automated parking), a slope recognition is furthermore necessary so that the vehicle can be stopped and parked, for example, in accordance with the available retention forces of the parking brake. The slope is generally ascertained via an acceleration sensor, which is typically installed in the brake control system (ABS/ESP), airbag control unit, or in a standalone manner. Alternative concepts for ascertaining the slope are sought and developed in the scope of the development of driving to functions for autonomous parking/driving.

SUMMARY

In contrast, the method and device according to the disclosure advantageously enable an alternative solution which can be implemented cost-effectively using already provided components. The solution can advantageously also be used as a redundancy concept for the failure of the regular acceleration sensor.

Examples of the disclosure include features specified in following the claims, detailed description, and drawings.

According to the disclosure, a method is provided for ascertaining a slope of a roadway on which a vehicle is located, wherein the method comprises the following steps:
inputting image data of surroundings of the vehicle supplied by an image sensor,
ascertaining a defined reference object in the surroundings of the vehicle from the image data,
ascertaining an angle relationship between the reference object and the surroundings,
estimating the slope of the roadway on the basis of the ascertained angle relationship, and
providing a signal representing the slope of the roadway.

Firstly, it is to be noted that the term slope of a roadway is to be understood, on the one hand, as the slope of the roadway in the travel direction of the vehicle (longitudinal axis) (also called the gradient or slope angle of the vehicle). Furthermore, the slope of a roadway is also to be understood as the slope of the roadway orthogonally to the travel direction of the vehicle (transverse axis) (also called pitch or roll angle of the vehicle). The method can thus ascertain the slope of the roadway in the travel direction of the vehicle and/or the slope of the roadway in the roll direction of the vehicle. Furthermore, this is understood to mean that the method estimates the slope of a roadway on the basis of image sensor data, for example, camera image data. The slope can be defined, for example, in percentage or degrees and/or described in coded form. The described method advantageously enables a simple estimation of the roadway slope in the longitudinal and transverse axes on the basis of the angle ascertainment between the reference object and its surroundings, and/or between the reference object and the roadway. Since the slope of the roadway substantially corresponds to the slope (in the travel direction and/or orthogonally to the travel direction) of a vehicle, the method is suitable for ascertaining the slope of a vehicle. An activation or actuation of a driver assistance function, for example, the automated parking brake (abbreviated APB) can advantageously be performed on the basis of the ascertained slope of the roadway. In this way, for example, the level of the initial brake force is defined. It can also be defined whether and at what strength a re-tensioning is to be carried out in the automated parking brake on the basis of the information about the slope. Alternatively, it can also be established on this basis for how long a time monitoring of possible initial rolling of the parked vehicle is to take place. With respect to the definition of a suitable reference object, it is to be noted that in particular objects having vertical structures can advantageously be used. A structure is understood as vertical when it is oriented toward the center of the earth, i.e., stands at a right angle to a horizontal surface of the earth. In addition to the definition, ascertainment, and use of an individual reference object, it is also conceivable that multiple reference objects are defined, ascertained, and the angle relationships thereof to the surroundings and/or the roadway are analyzed. The validity of the roadway slope estimation can advantageously be enhanced in this way. In particular vehicle cameras can be used as image sensors. Both the front camera and also the side cameras have proven to be suitable for this purpose. For example, the front camera can also be used to ascertain the image data for the estimation of the slope (or inclination) in the travel direction and the side camera can be used to ascertain the image data for the estimation of the slope (or inclination) orthogonally to the travel direction.

In one advantageous embodiment, the method comprises the following method step: ascertaining a deviation from the nominal angle between the reference object and the surroundings.

This is understood to mean that the angle between the reference object and the surroundings is considered in a differentiated manner. On the one hand, the nominal angle of the reference object is ascertained. On the other hand, the deviation of the surroundings from the nominal angle of the reference object is ascertained. A nominal angle is to be understood as an angle between the vertical structure of the reference object and a (possibly imaginary) horizontal plane at the base point of the reference object. In the case of a vertically upright structure of the reference object, the nominal angle is a right angle. The deviation of the surroundings from the nominal angle of the reference object means the angle deviation of the surroundings from a horizontal plane at the base point of the reference object. A good validity of the results is advantageously achieved in this way. Furthermore, this ascertainment is to be executed in a relatively simple manner.

Furthermore, it is to be noted at this point that the nominal angle can already be ascertained by means of earlier measurements. The data thus ascertained can be retrieved as needed as a database from an internal memory or the cloud. This also applies to the slope of the roadway, which was ascertained, for example, at an earlier point in time, when the acceleration sensor was still functional. The nominal angle and/or the slope can then accordingly be learned and calibrated as a reference and/or used as a control for the estimation which now takes place. This furthermore enhances the validity of the results. Alternatively, the nominal angle of determined reference objects can also be available and can be used as external information, for example, by way of stored (and possibly GPS-related) data.

In one possible embodiment, the method comprises the following method step: ascertaining the slope of the roadway in consideration of an ascertained deviation from the nominal angle between the reference object and the surroundings.

This is understood to mean that the ascertainment of the slope takes place not only in consideration solely of the angle relationship between the reference object and the surroundings, but rather also the respective nominal angle of the reference object and the deviation of the surroundings therefrom are taken into consideration. A good result quality can advantageously be achieved in this way by means of simple computation.

In one preferred embodiment, the method comprises the following method step: ascertaining an angle relationship between the surroundings and the roadway.

This is understood to mean that the angle relationship between the surroundings and the roadway is taken into consideration in the ascertainment of the roadway slope. In this respect, in particular the ground structure, i.e., the surface of the ground of the surroundings, is understood as the surroundings. The assumption can be made in this case, for example, that the slope of the surroundings (i.e., the ground which encloses the reference object) substantially corresponds to the slope of the roadway. Alternatively, the angle difference between (the ground of) the surroundings and the roadway can also be ascertained. The result quality can advantageously be improved by a further consideration of such factors.

In an alternative refinement, the method comprises the following method step: ascertaining the slope of the roadway in consideration of an angle relationship between the reference object and the roadway.

This is understood to mean that a direct angle relationship is ascertained between the reference object and the roadway. The roadway slope is estimated based on and/or in consideration of this angle relationship. A consideration of the ascertained deviation from the nominal angle between the reference object and the roadway can take place for this purpose, of course. A good validity of the slope estimation is advantageously enabled in this way.

In one advantageous embodiment of the method, the defined reference object has a substantially vertically aligned structure and/or the defined reference object (7) has a substantially horizontally aligned structure.

This is understood to mean that the reference object includes a vertically oriented structure or consists thereof. This structure can extend vertically, for example. Vertical—as already stated—is understood as the structure extending perpendicularly to the horizontal surface of the earth, and/or being aligned toward the center of the earth. Of course, only at least parts of the structure can also be aligned substantially vertically. These parts are advantageously to be well differentiated from the remaining structure and thus are to be identified in the image data, however. A simple ascertainment of the angle derivations can advantageously take place due to vertical structures. Furthermore, a good validity with respect to the estimation of the roadway slope is thus achieved. In an additional or alternative embodiment, the reference object can have a substantially horizontally aligned structure or can consist thereof.

In one possible embodiment of the method, the defined reference object comprises one or more of the following objects and/or consists thereof:
  a building line,
  a building structure,
  a traffic sign,
  a guide rail,
  an item of vegetation growing substantially perpendicularly, in particular a tree trunk,
  a building girder in a building,
  a wall and/or a vertical edge between two walls in a building.

In a surprising manner, in particular these objects have proven to be suitable reference objects in the evaluation. A high level of security can thus be achieved in the ascertainment of the angle deviations. Good results are thus enabled in the estimation of the roadway slope.

In one preferred refinement of the method, the signal representing the slope of the roadway can be used to actuate an assistance system and/or is used for this purpose.

The camera can thus advantageously be used as a sensor to ascertain the slope of the roadway and carry out a control of the driver assistance system based on these data. Assistance of the driver is enabled in this way. A high level of maintenance and execution of automated assistance systems can therefore advantageously be carried out in this way and/or the necessity of a driver intervention can be reduced. An assistance system can be understood, for example, as a system for carrying out an automated parking procedure. Furthermore, for example, an automated parking brake is also to be understood as an assistance system for the driver.

In an alternative embodiment, the method is executed when inadequate ascertainment of the slope by means of an acceleration sensor is recognized, in particular in the case of recognized lacking functionality of the acceleration sensor and/or in the case of an absent, faulty, or invalid signal of the acceleration sensor or another failure of the acceleration information.

This is understood to mean that the method is only executed if no valid signals of the acceleration sensor are provided. The acceleration sensor is installed in a variety of vehicles. This is required, for example, for an ESP system. The sensor supplies data about the acceleration in multiple dimensions. The slope of the vehicle is generally also ascertained therefrom. Slope sensors are therefore also to be subsumed under the term acceleration sensors in the scope of the present disclosure. In the event of a failure of this sensor, numerous functions are no longer available or can only still be executed with restricted functional scope. The present method advantageously offers a redundancy concept for this sensor. In this sense, the present method is to be understood as a fallback level for a failure of the acceleration sensor, in particular if only a slope signal is required for the assistance function. A high level of maintenance and execution of automated assistance systems can advantageously be carried out in this way.

In one possible embodiment, a method for operating a brake device of a vehicle is provided, which comprises the following steps:

identifying inadequate ascertainment of the slope by means of an acceleration sensor, and carrying out the method for ascertaining the slope of the roadway according to any one of the preceding embodiments, and providing a signal for an automated parking brake, and actuating the automated parking brake in consideration of the signal.

This is to be understood to mean that the described method for ascertaining the slope is integrated into a method for operating an automated parking brake. A redundancy concept for the parking brake is advantageously provided in this way. In this case, the regular method for operating the parking brake comprises ascertaining the slope by means of an acceleration sensor. In the event of a failure of this sensor, the ascertainment is now performed by means of the video system. Such a redundancy is particularly advantageous for (highly) automated parking maneuvers. Furthermore, only components which are installed in such a vehicle in any case are advantageously used. Additional components and thus costs for implementing the redundancy concept can advantageously be omitted in this way.

Furthermore, a device for ascertaining a slope of a roadway on which a vehicle is located is provided according to the disclosure, wherein the device is configured to execute the method according to any one of the above-described method steps when it is used as intended.

This is understood to mean that the device is designed to carry out, i.e., is configured and/or has means to carry out, a method as described above when it is used as intended. A control unit and/or a storage element and/or an operating element can be considered as a device, for example. Thus, for example, an ESP control unit or APB control unit, which carries out a control of a parking brake. In particular, a control unit is provided, which is configured and designed for the purpose of actuating multiple provided automated parking brakes of a vehicle independently of one another. An image sensor and/or a video system can furthermore also be understood as a device. The advantages already described in the scope of the method can be implemented by such devices.

A device can thus also be understood as an electrical device, which processes sensor signals and outputs control signals and/or data signals in dependence thereon. The device can have an interface, which can be designed in hardware and/or software. In the case of a hardware design, the interfaces can be, for example, parts of a so-called system ASIC, which contains greatly varying functions of the device. However, it is also possible that the interfaces are separate integrated circuits or at least partially consist of discrete components. In the case of a software design, the interfaces can be software modules, which are provided, for example, on a microcontroller in addition to other software modules. The object on which the disclosure is based can also be achieved efficiently and cost-effectively by this embodiment variant of the disclosure in the form of a device.

In addition, an automated parking brake is provided, which is configured to execute the method according to any one of the above-described method steps when it is used as intended.

Furthermore, a computer program is provided according to the disclosure, which is configured to execute the described method when the computer program product is executed on a device, and a machine-readable storage medium, on which the computer program is stored. This is understood to mean that the computer program has program code for carrying out one or more or all of the above-mentioned method steps when the computer program is executed on a computer. A computer program product having program code, which can be stored on a machine-readable carrier such as a semiconductor memory, a hard drive memory, or an optical memory and is used to carry out the method according to any one of the above-described embodiments when the program product is executed on a computer or a device, is thus also advantageous. The approach proposed here thus provides a computer program product having program code for carrying out the method according to a variant proposed here when the program product is executed on a device.

DETAILED DESCRIPTION

It is to be noted that the features listed individually in the description can be combined with one another in any desired technically reasonable manner and can disclose further embodiments of the disclosure. Further features and intended uses of the disclosure result from the description of exemplary embodiments on the basis of the appended figures.

Figure 1:
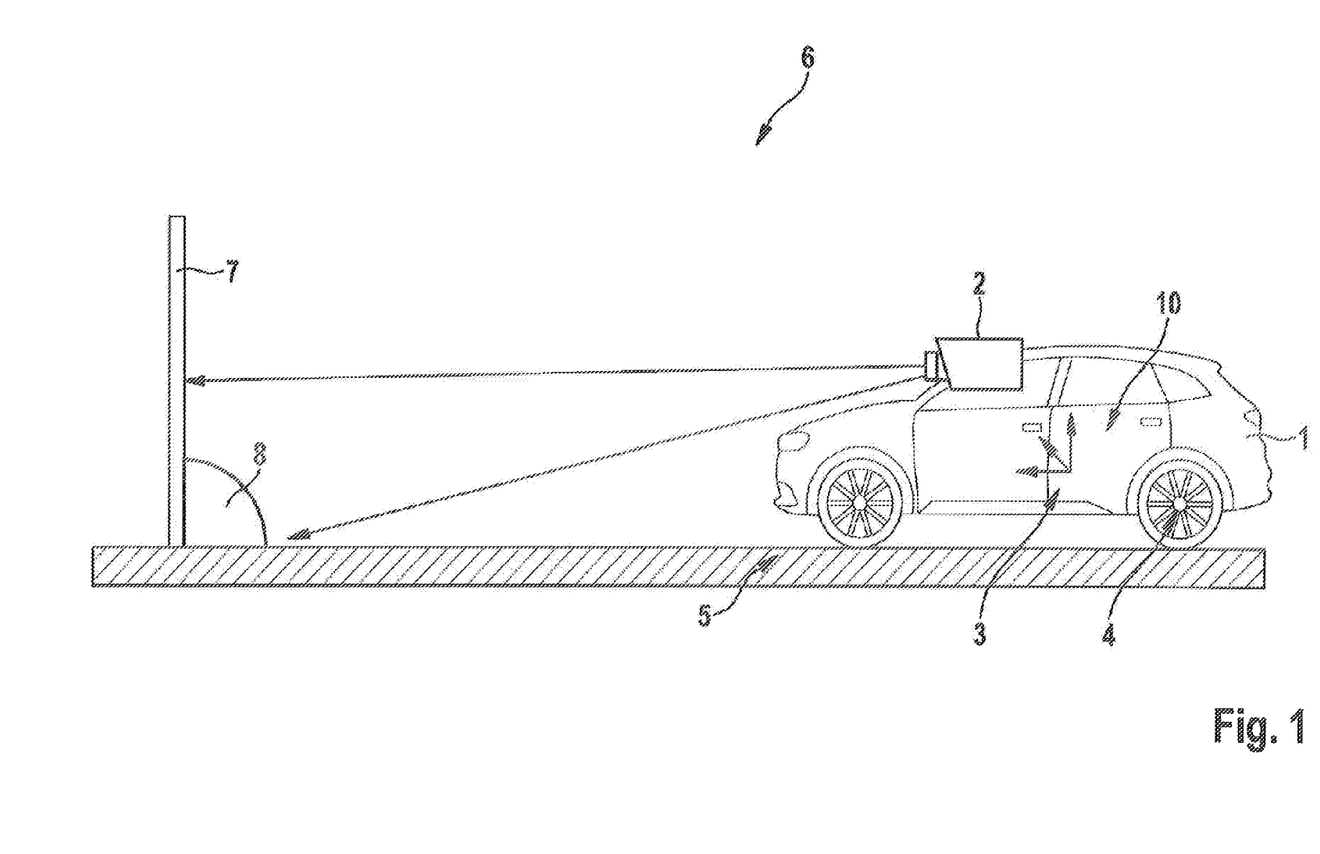
FIG. 1 shows a schematic illustration of a vehicle having a camera, which records a reference object on a horizontal roadway.

FIG. 1 shows a schematic illustration of a vehicle having a camera, which records a reference object on a horizontal roadway. The vehicle 1 is designed as a passenger vehicle. This vehicle 1 has an image sensor 2. This image sensor 2 is an outwardly oriented camera. A front camera and/or a side camera, for example, can be used in this case. The lines shown indicate exemplary acquisition points from the acquisition range of the image sensor 2. The image sensor 2 produces image data of the surroundings 6 of the vehicle 1. These image data are further processed, for example, by the control unit 10. Furthermore, the vehicle 1 has an acceleration sensor 3. The acceleration sensor 3 is shown as a three-dimensional coordinate system, in order to illustrate the capability of position recognition. In general, however, 6 dimensions are acquired by the acceleration sensor 3, wherein the rotation rates can also be considered here. As already indicated, the slope of the vehicle 1 can be ascertained by means of the acceleration sensor 3. The slope of the vehicle 1 usually corresponds to the slope of the roadway 5. In the case of a functional acceleration sensor 3, the slope of the roadway 5 can therefore also be estimated. The knowledge of the roadway slope is important, for example, to enable, activate, and/or adapt an activation of driving functions and/or driving assistance functions. For example, the level of the clamping force and the necessity and strength of a re-tensioning process in the automated parking brake 4 is partially also defined by the roadway slope. The vehicle 1 has two automated parking brakes 4, one on each of the rear wheels, which are indicated in FIG. 1. Furthermore, a reference object 7 is shown in FIG. 1. This reference object 7 has a substantially vertical structure. The reference object 7 can be, for example, a corner of a house. Due to the vertically aligned structure of the reference object 7, in the case of a horizontal roadway 5, a right angle results between the roadway 5 and the reference object 7. The angle between the reference object 7 and a horizontal line in the base point of the reference object 7 is marked as the nominal angle 8.

Figure 2:
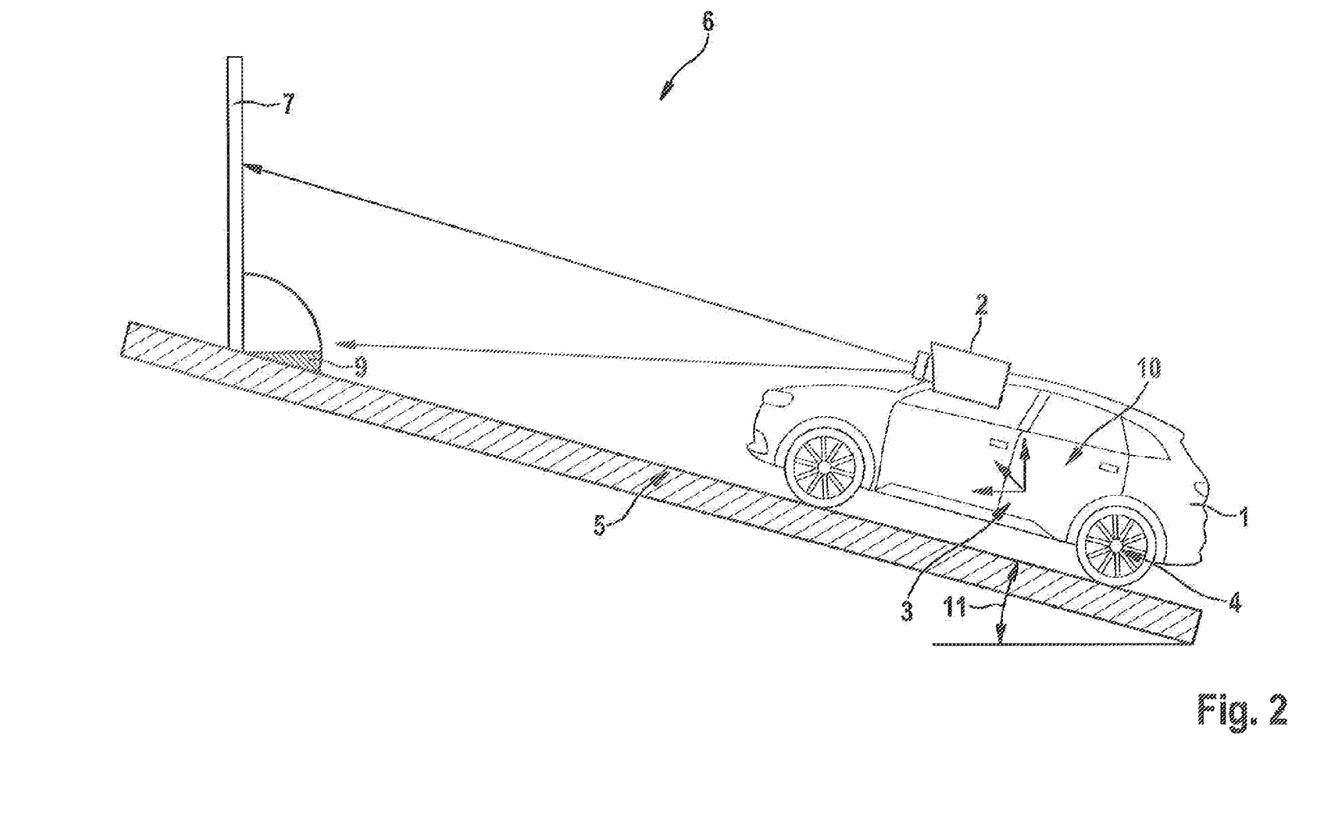
FIG. 2 shows a schematic illustration of a vehicle having a camera, which records a reference object on a roadway inclined in the travel direction.

FIG. 2 shows a schematic illustration of a vehicle having a camera, which records a reference object, and the vehicle is located on an inclined roadway. The illustrated elements substantially correspond to the elements illustrated in FIG. 1. In addition, the slope 11 of the roadway 5 is illustrated, on which the vehicle 1 is located. The illustrated slope 11 extends in the travel direction in this case. A change of the angle between the reference object 7 and the roadway 5 also results due to the slope 11 of the roadway 5. This change from the nominal angle is referred to as the deviation 9.

Figure 3:
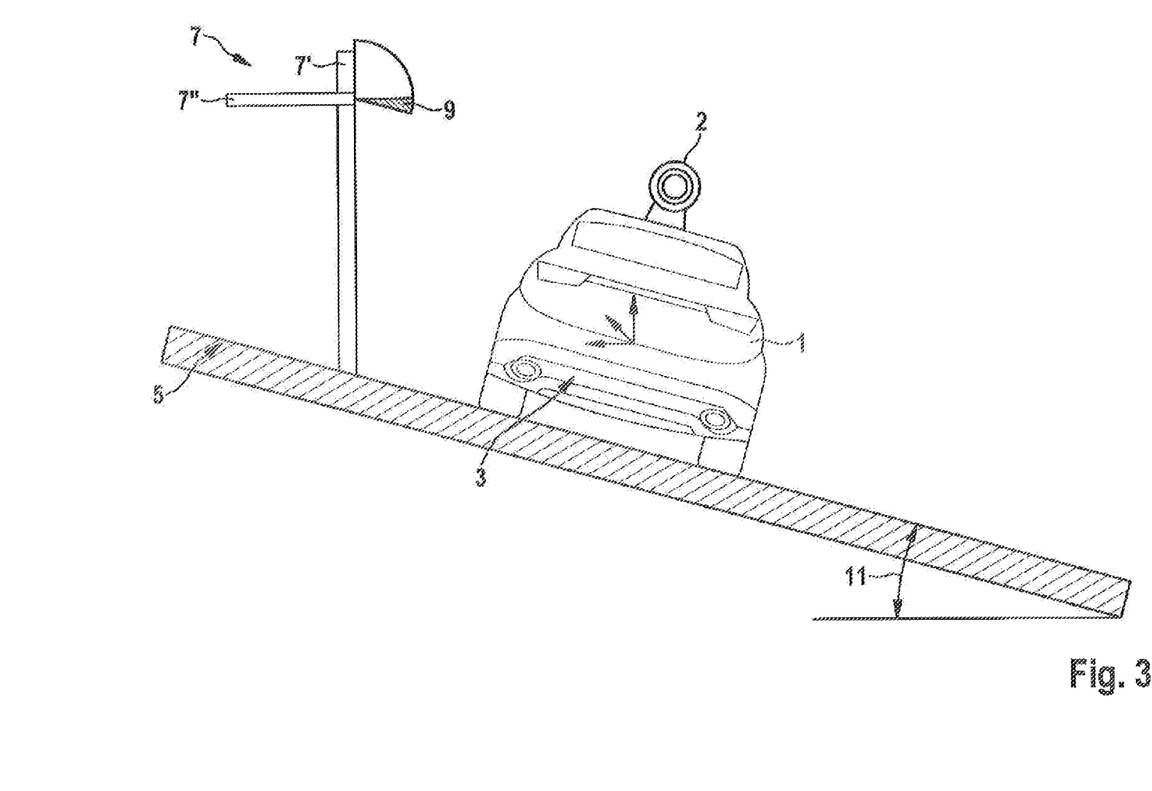
FIG. 3 shows a schematic illustration of a vehicle having a camera, which records a reference object on a roadway inclined orthogonally to the travel direction.
Figure 4:
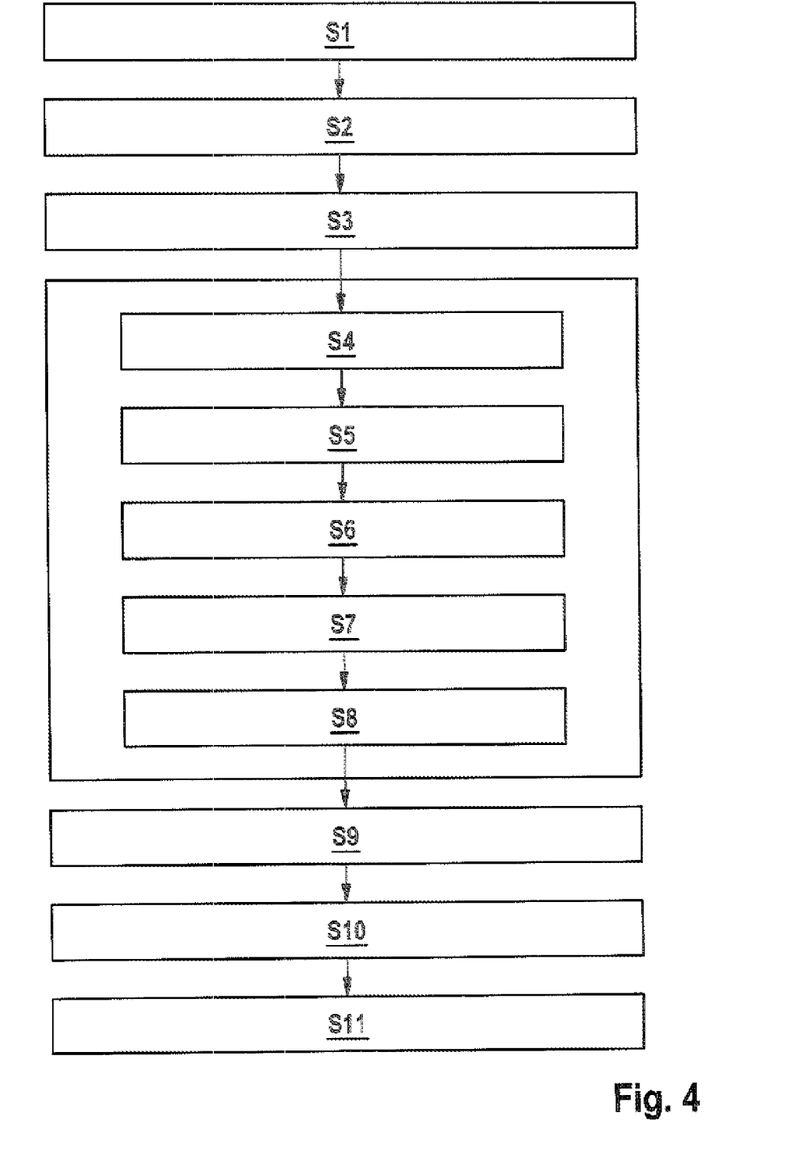
FIG. 4 shows the method steps of an exemplary embodiment of the method.

FIG. 3 shows a schematic illustration of a vehicle having a camera, which records a reference object, and the vehicle is located on an inclined roadway. The illustrated elements substantially correspond to the elements illustrated in FIG. 1 and FIG. 2. The reference object 7 is furthermore distinguished in that it is composed of a vertical reference object 7' and a horizontal reference object 7". As in FIG. 2, the slope 11 of the roadway 5 is shown, on which the vehicle 1 is located. The illustrated slope 11 extends in this case in the roll direction of the vehicle, i.e., orthogonally to the actual travel direction.

FIG. 3 shows an illustration of the method steps in one embodiment of the disclosure. In this case, the start of the method takes place in a first step S1. The start of the method can be, for example, manually activated and/or can be automated by external factors, such as or the start of the vehicle or a specific driving situation. In a next step S2, it is checked whether the necessary conditions are present for carrying out the further method steps. For this purpose, it is checked, for example, whether valid items of acceleration information are present. Alternatively or additionally, it can be checked in S2 whether a slope signal is necessary in the present driving situation. If data are available from the acceleration sensor and appear trustworthy, these data can already be used to activate a vehicle function. However, if a failure of the items of acceleration information is identified in step S2, the further steps of the method are executed. For example, in a next step S3, image data are produced using the image sensor of a video system of the vehicle. The video system is oriented forward, for example, in the travel direction of the vehicle and records the surroundings of the vehicle in the acquisition range of the video system in front of the vehicle. In a next step S4, the input of the image data which were produced by the video system takes place. The input can take place, for example, into a control unit having a data memory. The image data are subsequently processed and analyzed. For this purpose, in a step S5, the ascertainment of the defined reference object takes place. This includes the identification of the reference object. Furthermore, the reference object can be marked, labeled, or identified in another form. In a next step S6, the ascertainment of the angle relationships takes place. This is understood as the ascertainment of the angle relationship between reference object and roadway of the vehicle. The ascertainment of this angle relationship can be divided into the ascertainment of the angle relationship between the reference object and the surroundings of the reference object (and/or the vehicle) and between the surroundings of the reference object and the roadway. In the scope of the ascertainment of the angle relationships, the ascertainment of a nominal angle (for example, the nominal angle of the reference object) and/or the ascertainment of a deviation of the actual angle from the nominal angle can also take place. Based on the ascertained data, the slope of the roadway of the vehicle is estimated in a next step S7. If the estimation has taken place, it can furthermore also be compared to existing data (for example, from earlier measurements while the acceleration sensor was still functional) for validation. Subsequently thereto, in step S8, a provision of a signal takes place, which represents the ascertained slope of the roadway. Of course, this signal can be tapped or relayed in a further step S9. For example, the relay of the signal takes place to the control unit of the automated parking brake. The control unit of the automated parking brake is generally integrated into the control unit of the ESP system, for example, it is formed thereby. The signal now applied therein is taken into consideration in the further sequence during the control of the automated parking brake. A corresponding actuation of the automated parking brake on the basis or at least in consideration of the ascertained signal on the roadway slope takes place in a step S10. The method is ended in a step S11, for example, by a manual deactivation or an automatic deactivation, for example, in the case of a parked vehicle.

What is claimed is:

1. A method for operating a vehicle, comprising:
generating image data with an image sensor mounted on the vehicle in an outwardly-oriented configuration, the image sensor configured to generate the image data within an acquisition range of the image sensor;
processing the image data with a control unit operatively connected to the image sensor to identify a suitable reference object and a roadway in the acquisition range, the vehicle located on the roadway, and (i) the suitable reference object being in a fixed position relative to the roadway, and/or (ii) the roadway having a substantially constant slope for a length of the roadway extending between the vehicle and the suitable reference object;
measuring a nominal angle from the identified suitable reference object to a horizontal plane;
estimating a slope of the roadway as a deviation angle determined by the control unit, the deviation angle measured from a plane parallel to the roadway to the horizontal plane;
generating a signal indicative of the estimated slope of the roadway with the control unit; and
actuating an automated parking brake of the vehicle based on the signal indicative of the estimated slope of the roadway, the automated parking brake operatively connected to the control unit.

2. The method of claim 1, wherein:
the suitable reference object includes a vertically aligned structure; and
the nominal angle is a right angle.

3. The method of claim 1, wherein the suitable reference object is at least one of:
a vertical edge of a building;
a traffic sign;
an item of vegetation growing vertically; and
a vertical building girder.

4. The method of claim 1, further comprising:
actuating a system for carrying out an automated parking procedure based on the signal indicative of the estimated slope of the roadway,
wherein the system for carrying out the automated parking procedure is actuated before the actuation of the automated parking brake.

5. The method of claim 1, further comprising:
determining, with the control unit, that an acceleration sensor of the vehicle is either available or unavailable for determining a measured slope of the roadway,
wherein the automated parking brake is actuated based on the signal indicative of the estimated slope of the roadway only when the control unit determines that the acceleration sensor is unavailable.

6. The method of claim 3, wherein:
the suitable reference object includes an item of vegetation growing vertically, and
the item of vegetation is a tree trunk.

7. The method of claim 5, wherein the determination that the acceleration sensor is unavailable includes determining an absent, faulty, or invalid acceleration signal of the acceleration sensor.

8. The method of claim 1, wherein the slope of the roadway is orthogonal to a direction of travel of the vehicle.

9. The method of claim 1, wherein the suitable reference object includes a structure that is oriented toward a center of the Earth.

10. A method for operating a vehicle including an acceleration sensor and an automated parking brake, comprising:
identifying, with a control unit of the vehicle, that the acceleration sensor is unavailable for determining a slope of a roadway on which the vehicle is located;
determining the slope of the roadway by:
generating image data with an image sensor mounted on the vehicle in an outwardly-oriented configuration, the image sensor configured to generate the image data within an acquisition range of the image sensor, and the image sensor operatively connected to the control unit;
processing the image data with the control unit to identify a reference object and the roadway in the acquisition range, the reference object including at least one of a vertically aligned structure and a horizontally aligned structure, the vehicle located on the roadway and (i) the reference object being in a fixed position relative to the roadway, and/or (ii) the roadway having a substantially constant slope for a length of the roadway extending between the vehicle and the reference object;
measuring a nominal angle from at least one of (i) the vertically aligned structure to a horizontal plane, and (ii) the vertically aligned structure to the horizontally aligned structure;
estimating the slope of the roadway on which the vehicle is located as a deviation angle measured from a plane parallel to the roadway to the horizontal plane; and
generating a signal indicative of the estimated slope of the roadway with the control unit; and
actuating the automated parking brake based on the signal indicative of the estimated slope of the roadway, the automated parking brake operatively connected to the control unit.

11. A system for a vehicle, comprising:
an image sensor mounted on the vehicle in an outwardly-oriented configuration and configured to generate image data within an acquisition range of the image sensor; and
a device operably connected to the image sensor and configured to:
process the image data to identify a reference object and a roadway in the acquisition range, the reference object including at least one of a vertically aligned structure and a horizontally aligned structure, the vehicle located on the roadway;
estimate a slope of the roadway as a deviation angle measured from a plane parallel to the roadway to the horizontal plane;
generate a signal indicative of the estimated slope of the roadway; and
actuate an automated parking brake of the vehicle based on the signal indicative of the estimated slope of the roadway, the automated parking brake operatively connected to the device,
wherein (i) the reference object is in a fixed position relative to the roadway and/or (ii) the roadway has a substantially constant slope for a length of the roadway extending between the vehicle and the reference object.

12. The system of claim 11, further comprising:
a computer program product that includes program code.

13. The system of claim 12, further comprising:
a machine-readable data storage device operatively connected to the device,
wherein the computer program product is stored on the machine-readable data storage device.

14. The system of claim 11, wherein:
the reference object is a first reference object including at least one of a first vertically aligned structure and a first horizontally aligned structure,
the image sensor is a front image sensor,
the image data is front image data,
the nominal angle is a first nominal angle,
the deviation angle is a first deviation angle,
the vehicle further comprises a side image sensor mounted on the vehicle in an outwardly-oriented configuration and configured to generate side image data orthogonal to the front image data within an acquisition range of the side image sensor,
the device is further configured to:
process the side image data to identify a second reference object in the acquisition range of the side image sensor, the second reference object including at least one of a second vertically aligned structure and a second horizontally aligned structure;
measuring a second nominal angle from at least one of (i) the second vertically aligned structure to the horizontal plane, and (ii) the second vertically aligned structure to the second horizontally aligned structure;
estimate a pitch of the roadway as a second deviation angle measure from the plane parallel to the roadway to the horizontal plane; and
generate a signal indicative of the estimated pitch of the roadway, the automated parking brake of the vehicle is actuated based on the signal indicative of the estimated slope of the roadway and the signal indicative of the estimated pitch of the roadway.

* * * * *